UNITED STATES PATENT OFFICE.

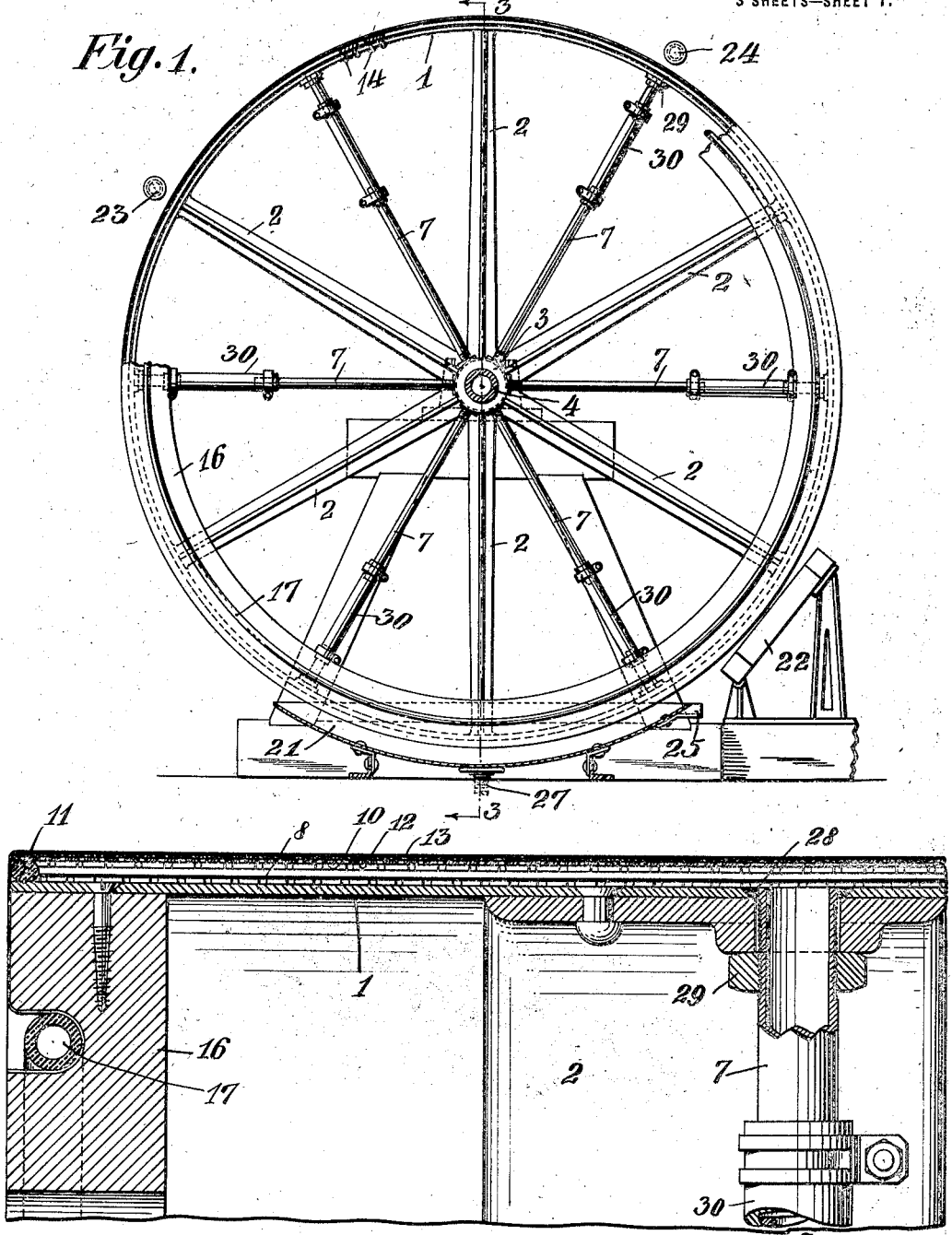

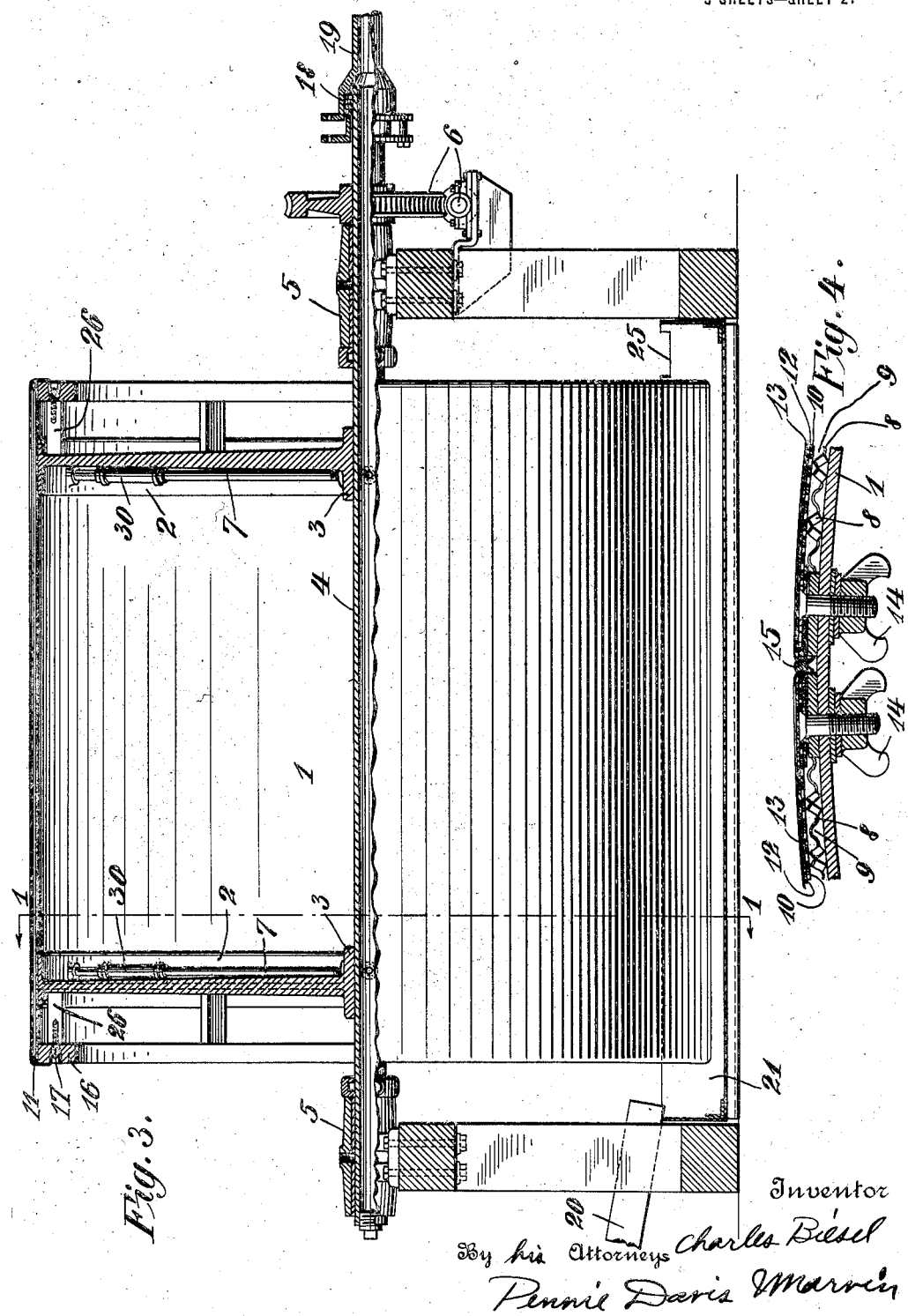

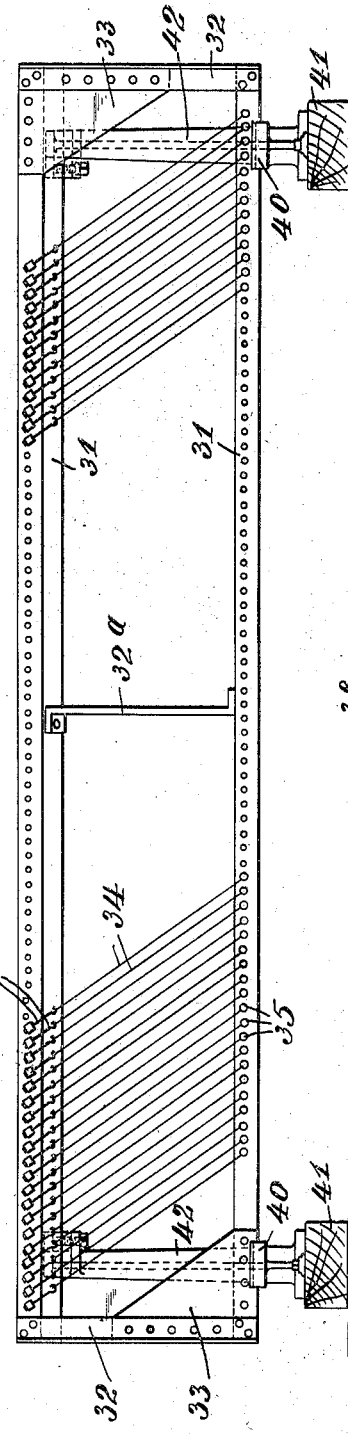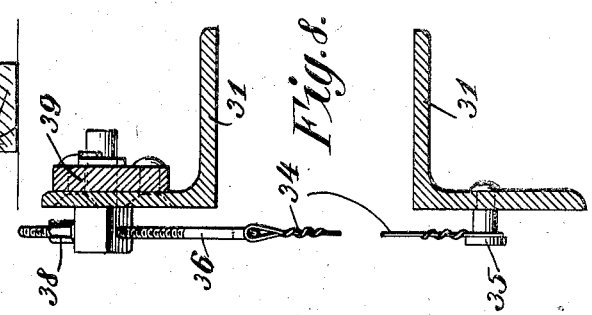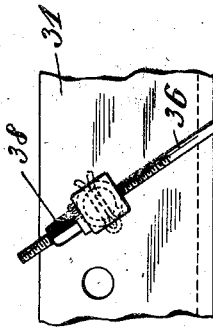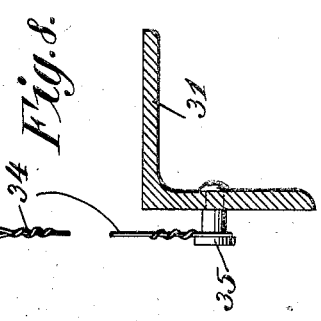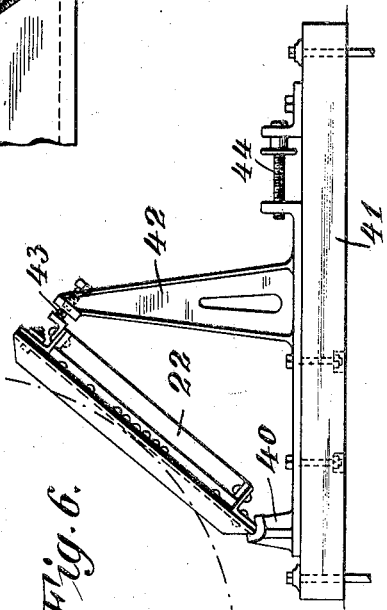

CHARLES BIESEL, OF EL PASO, TEXAS.

CONTINUOUS-VACUUM DEHYDRATOR.

1,276,163.	Specification of Letters Patent.	Patented Aug. 20, 1918.

Application filed January 11, 1917. Serial No. 141,775.

*To all whom it may concern:*

Be it known that I, CHARLES BIESEL, a citizen of the United States, residing at El Paso, Texas, have invented certain new and useful Improvements in Continuous-Vacuum Dehydrators; and I do hereby declare the following to be a full, clear, and exact description of the invention, such as will enable others skilled in the art to which it appertains to make and use the same.

This invention relates to a continuous filter or dehydrator and to improvements in the construction thereof and in pulp deflectors therefor. More particularly the invention relates to such a filter or dehydrator for use in connection with gold and silver ores, but also adapted for use in gravity concentration and flotation practice in connection with copper, zinc, lead and other ores or for use in connection with other material.

It is an object of the invention to provide a filter or dehydrator for separating, rapidly, cheaply and continuously, liquors and solutions from accompanying solids, such as occur in metallurgical practice and more particularly in the cyanidation, concentration and flotation of ores.

It is a further object of the invention to provide such a filter or dehydrator which will produce a "cake" containing a low percentage of moisture, which will enable the washing of the cake to be facilitated, and which will break up and remove the dehydrated, or dehydrated and washed, cake or pulp or similar residue in a particularly advantageous manner; such removal being effected while the filtering surface is under a vacuum or suction and without injury to the filtering medium or surface itself and without causing loss of the vacuum or suction which it is desired to maintain in operations familiar to the filtration of ores and similar materials in metallurgical practice.

With the above and other objects in view, the invention comprises a continuous-vacuum filter or dehydrator, and improvements therein, whereby the operation of extracting valuable metals from ores under treatment may be accelerated, increased and cheapened; and whereby the pregnant solution still retained by the ore may be readily displaced by further amounts of barren or fresh solvent solution or by water direct.

In the accompanying drawings I have illustrated the preferred embodiment of my invention, and the invention will be described more particularly in connection therewith, but it will be understood that the illustration and accompanying description are to be taken as illustrative of the invention and not as limiting its intent and scope.

In the accompanying drawings:

Figure 1 is an end view of the filter or dehydrator embodying the invention, with parts broken away or shown in section;

Fig. 2 is an enlarged longitudinal section of part of the filter or dehydrator;

Fig. 3 is a side elevation with parts broken away or in section;

Fig. 4 is an enlarged cross-section showing the means for fastening the ends of the filtering mediums;

Fig. 5 is an enlarged longitudinal projection (parts being omitted) of the deflector for removing the filtered dehydrated residue or cake from the filtering surface;

Fig. 6 is an end view of the deflector of Fig. 5, and

Figs. 7 and 8 show respectively enlarged detail views of the front and end of the deflector showing the means for attaching the wires thereto.

I will first proceed to describe the improved vacuum filter or dehydrator, and I will then proceed to describe more in detail the specific construction of the pulp deflector; inasmuch as I consider that both the filter or dehydrator in itself, and the deflector in itself, as well as the novel combination of the deflector with the filter, embody novel and important features and elements of the invention.

Referring first to Figs. 1 to 4, it will be seen that the novel filter or dehydrator (which I will refer to simply as the "filter") comprises a drum made of suitable material and of such appropriate dimensions as may be required, in accordance with the desired capacity and other conditions of use. This drum is made up of an inner shell 1 mounted on, and fastened to, two or more narrow face pulleys 2 of proper diameter. The hubs 3 of these pulleys are fastened in any suitable manner to the hollow shaft 4 which supports the drum and which is mounted in bearings 5 supported in any appropriate framework or supports. The hollow shaft and drum are driven or rotated by the worm and gear 6 or by other suitable means from any convenient source of power, regulating means (not shown) being provided if necessary in order that the drum may revolve at a given speed or at such different speeds as may give the desired result.

The shell 1 of the drum is tapped at more or less even intervals by pipes or other conduits 7 which in turn connect with the hollow shaft 4. The arrangement is such that the hollow shaft communicates through the pipes 7 with the space on the outside of the shell 1. This hollow shaft in turn connects, through a stuffing box 18 providing an air-tight connection, with the pipe 19 through which a suitable source of vacuum or suction can be supplied and maintained.

Surrounding the shell 1 is a space-forming medium or space-forming mediums such as wire screen, expanded metal strips, or other suitable medium indicated at 8, of a nature adapted to permit free circulation and to form an air or vacuum space 9, the depth of which can be varied to suit varying conditions. The medium which provides this air or vacuum space is indicated by the uneven lines in Fig. 4. On this space-forming medium is mounted a porous or perforated medium 10 of any proper description, preferably a perforated screen which will form a comparatively true and even surface concentric with the periphery of the shell and drum. This porous or perforated medium can be fastened to the shell in any suitable manner so long as it is held in place with relation to the periphery of the shell itself. The end openings between the drum 1 and the perforated screen 10, at the ends of the space-forming medium 8, are sealed by resilient gaskets 11 which are held in place and which provide an air-tight closure; or in place of these gaskets other suitable means can be used.

On the outside of the porous medium 10, which may be of woven or punched steel screening, is a thin and relatively resilient open filtering medium of suitable kind, preferably common burlap 12, for the purpose of facilitating the discharging of the filter cake as well as for preventing possible rusting or corrosion of the final outside cover or filtering medium 13 which may be of canvas, cheesecloth or other suitable material. In order to fasten the medium 12 and the outside filtering medium 13, their ends are tucked under the ends of the perforated screen 10, as shown in Fig. 4, the thumb screws 14 being slightly released to permit this to be done. The thumb screws 14 are then drawn tight holding the various mediums 8, 10, 12 and 13 in place. As an additional precaution a gasket or wedge 15 can be driven between the ends of the screen 10 further sealing the joint, and further gripping and clamping the mediums 12 and 13. The sides of the medium 13, at the ends of the drum, are folded over the edges of the drum and are drawn and wedged tight into a groove provided for this purpose in the annular ring 16 which is suitably fastened to the shell 1 and made of wood or other suitable material. The drawing and wedging into this groove may be effected with the gasket 17 of suitable material or by wedges or by any other suitable means. Spacing and supporting blocks 26 are shown between the arms of the pulleys 2 and the rings 16.

The pipes or conduits 7 connecting the shell 1 with the hollow central pipe or shaft are shown as made of an outer pipe member welded to the shell at 28 and also secured thereto by the lock-nut 29, and of an inner pipe member connected to the hub of the pulley and to the central hollow shaft. These two pipe members are shown as connected with a rubber hose 30 suitably clamped thereto.

It will thus be seen that the filtering drum is a wheel-like structure, of suitable form and arrangement, entirely open through its center except for the arms of the pulleys and the connecting pipes 7; and that a single air compartment is provided outside the shell 1 and between this shell and the outer filtering medium 13; so that when suction is applied to the hollow central pipe or shaft through the vacuum pipe 19 this suction will be transmitted through the pipes 7 to this air or vacuum space at the periphery of the drum.

The pulp and liquid, or other material to be filtered or dehydrated, is fed through the launder 20 into the receptacle 21 which is provided with an emergency overflow 25 and into which the filtering drum dips. A suitable number of spray pipes are independently provided outside the periphery of the drum for applying wash-water or fresh amounts of solvent liquor to the pulp being dehydrated. Two such pipes 23 and 24 are shown. The ore deflector is indicated at 22 in Fig. 1.

Assuming the drum to be rotating in a clockwise direction, as shown in Fig. 1, and that the drum moves in this direction at a speed appropriate to the conditions and requirements of the material being filtered or dehydrated, and that the pulp and liquid is fed into the receptacle 21 through the launder 20, the revolving drum will pass through the receptacle 21 slightly submerged and the vacuum applied through the central hollow pipe 4, and the pipes 7 to the hollow space at the periphery of the drum, effects the depositing of a cake of pulp upon the outside filtering medium. The thickness of this cake or layer will depend upon the class of material being filtered, the density of the pulp, the speed of the drum's contact with the pulp, the amount of suction force applied, etc. Assuming that the cake has been suitably dehydrated by the time it is opposite the spray pipe 23, a wash spray of suitable liquid can here be applied. If the ore cake has again been dehydrated when it is opposite the pipe 24, another wash spray, if desired, can be applied, this spray being either a wash spray or a displacing spray such as will for example replace the liquor still retained by the layer of pulp by a fresh solvent liquor. The cake will be again dehydrated and will be finally removed by means of the deflector 22 which I will hereinafter describe more in detail.

The cake discharged at 22 can be transported by sluicing or by conveyers or by other suitable means to whatever point of further treatment or discharge may be desired.

During the entire revolution and operation of the filter a substantially constant vacuum is maintained. This is made possible by a very thin film of cake adhering to the filtering medium 13 and sealing this medium between the discharge of the dehydrated cake at 22 and the beginning of a new layer of cake as the medium becomes immersed in the pulp to be dehydrated. The pulp discharged at 22 may thus be a pulp which has been both dehydrated and washed one or more times, or it may be simply dehydrated without washing, in which case the pipes 23 and 24 may be omitted, or their spraying action discontinued.

In stripping or deflecting the pulp or cake from the periphery of the drum, it is important that it should be removed without injury to the filtering surface and it is also important that it should be removed in such a way as to leave sufficient of the cake to form an effective seal until the filtering surface is again immersed in the pulp and a further cake begins to form. The deflector shown in Figs. 5 to 8 is designed particularly for effecting such purposes as those referred to in a particularly advantageous manner. In addition, this deflector effectively breaks up or comminutes the pulp so that it is more readily handled by conveyers or in subsequent treatments.

The deflector is composed of a plurality of spaced-apart wires arranged in a single plane substantially tangential to the peripheral surface of the filter drum, with each wire inclined at an angle to both a plane through the axis of the filter and radial with respect thereto and a plane perpendicular to the axis of the filter. It will accordingly be evident that every plane perpendicular to the axis of the filter intercepts a plurality of different wires, each one of which is progressively nearer, or farther removed from, the filtering surface than the next adjacent wire. And, also, every plane through the axis of the filter and radial with respect thereto intercepts a plurality of different wires at points substantially the same distance from the filtering surface.

This deflector, as illustrated, is made up of upper and lower frame members 31 of angle iron connected by end frame members 32 and a central stiffening member 32ª, corner brackets 33 for reinforcing the frame being provided at two diagonally opposite corners as shown. The frame can, of course, be made of suitable material and of such dimensions as may be required according to the capacity of the filtering and other conditions. The frame is equipped with suitable wires 34 arranged diagonally and held in place on the lower frame member by anchor pins 35 and on the upper frame member by swiveled screw hooks 36, adjustment of the wires being effected by the nuts 38. The upper frame member 31 is shown in Fig. 8 as being further reinforced by the strap 39. The diagonal wires are preferably of piano wire or of steel wire of a size which can be varied in accordance with the material to be treated, the amount of such material, and like considerations. The angle at which the wires are held, as well as the size and distance apart of the wires is directly related to the conditions accompanying the operation of the filter, namely, the thickness of the cake, the capacity and other conditions.

In order that the deflector may be adjusted both as to its inclination and as to its distance from the drum, an adjustable base is provided carried by the support 41 and slidable thereon by means of adjusting screws 44 or equivalent adjusting devices. This adjustable base comprises lower cradle arms or supports 40 for carrying the lower edge of the deflector and outer standards or arms 42 carrying adjusting screws 43 for raising or lowering the upper side of the deflector and thereby varying its angle and its inclination, so that it may be arranged tangentially and so that its relation with respect to the filter drum can be adjusted. Provision is thus made not only for maintaining the proper tension on the wires, by adjustment thereof, but also for varying the position of the wires against the surface of the filter or against the outer periphery of the rotary filter, where the filter is of a rotary nature.

As already noted a continuous vacuum is maintained during the filtering operation so that a layer of pulp is being continually formed and requires to be continually removed, if the operation of the filter is to be continuous. In practice, the cake or film of pulp adhering to the outside of the filter is cut by the wires held in tension against the outer surface of the filter and the upper or outer layer of the cake is thus removed. A very thin film of the cake or a thin layer of the pulp remains on the filtering medium and this is sufficient to seal the filtering medium after removal of the cake and until the filtering operation begins again by the immersion of the filtering surface in the pulp to be filtered. This continual sealing of the filtering medium is important since otherwise the vacuum would be destroyed and the filtering action would be seriously impaired. By maintaining this vacuum, the filtering action is made continuous even though there is but a single vacuum chamber, all parts of which are in communication with each other. Moreover, the construction and arrangement of the deflector, consisting as it does of a large number of diagonally arranged wires, so deflects and breaks up the layer of cake that this cake is of a more or less comminuted nature rather than in the form of separate cakes or lumps. Each wire in fact acts as a separate cutting and deflecting surface, and, since these wires are arranged substantially tangentially, the cutting and deflecting of the pulp is of a progressive nature. Instead of being limited to a single cutting edge, as with a single transverse deflector extending across the filtering surface, the novel deflector of the present invention provides a large number of cutting edges arranged diagonally so that the cutting and deflecting of the layer of pulp takes place over an appreciable length of the wire and a corresponding peripheral distance on the cake, instead of at a single horizontal transverse edge. That is to say, if the cake is of considerable thickness, the maximum cutting action will take place where the wires are closest to the filtering surface, while adjacent portions of the wires at a slightly greater distance from the periphery of the filtering medium are removing the outer portions of the cake which first comes in contact with them.

The apparatus of the present invention is one of notable simplicity of construction and operation, comprising but a single suction compartment, although capable of being subdivided into a plurality of compartments. The apparatus is one which is continuous in operation and one which enables the liquid contents of the pulp to be removed and the pulp itself to be continuously dehydrated. The suction which is applied continuously from the time the pulp is first brought into contact with the filtering surface until the pulp is finally removed therefrom results in the delivery of pulp with a low percentage of moisture, whether the pulp is in granular form or in the form of slimes.

Owing to the fact that the drum acts only upon a thin layer of pulp, instead of a cake of material thickness, the number of square feet of exposed and active filtering surface for a unit of time is considerably increased. This increased capacity is largely due to the fact that as the cake increases in thickness the time required for dehydration does not increase proportionately but at a rate of practically the square of the time previously consumed. Moreover the pulp during the process of dehydration as well as during the period of discharge receives a thorough aeration which is important and beneficial in certain metallurgical operations such as the cyanidation of ores.

It will further be noted that the device is continuous, and not intermittent, in its action and that the vacuum is continuously applied. It will be further noted that the apparatus is characterized by the entire absence of valves which require to be manipulated, controlled, operated or maintained; and that the whole apparatus is one of notable simplicity and maintained in proper condition at a minimum of expense.

Inasmuch as the filtering medium is exposed to continuous suction, it is held constantly against its support, and is thus distinguished from filters in which the filtering medium is subjected to alternate suction and release of the suction for the purpose of releasing the cake. The filtering medium moreover does not require to be sewed or prepared or manufactured in any particular form or shape and can be changed or replaced in a short time and without difficulty. When properly replaced and when the device as a whole is properly adjusted, the filter requires a minimum of attention and can be operated continuously for considerable periods of time.

Injury to the filter cloth is further avoided or minimized by the construction of the deflecting devices used and by the fact that such deflectors in use are intended to leave a thin film of pulp upon the filter cloth to seal it and thus do not wear on the filter cloth itself or injure it.

I claim:

1. A continuous-vacuum filter or dehydrator comprising a hollow drum provided with a peripheral suction chamber and with an outer filtering medium, means for applying a vacuum continuously to said chamber, means for supplying to said drum the pulp or other material to be filtered or dehydrated, and means for continuously deflecting or removing from said drum the dehydrated cake and the liquid removed therefrom without interrupting the vacuum in said peripheral suction chamber.

2. A continuous-vacuum filter or dehydrator comprising a drum provided with an outer filtering surface or medium, means for applying to said medium a continuous suction throughout the operation of the drum and for maintaining the surface of such filtering medium in constant and continual communication with the suction or vacuum, and means for removing the dehydrated cake from the surface of said filtering medium without interrupting the suction applied thereto.

3. A continuous-vacuum filter or dehydrator comprising a drum open through its central portion and provided with an outer annular chamber and a surrounding filtering surface or medium, a central hollow shaft supporting such drum, means connecting such hollow shaft with said chamber, means for continuously maintaining a vacuum in said hollow shaft and in said chamber, whereby the filtering surface is subjected to the continuous action of the suction or vacuum, and means for removing the dehydrated cake from said filtering surface without interrupting the vacuum in said chamber.

4. A continuous-vacuum filter or dehydrator comprising a drum made up of an inner shell and an outer filtering medium spaced apart from such shell and forming therewith a peripheral chamber, means for applying suction or vacuum to such chamber throughout the operation of the filter, and means for supplying to said filtering surface the material to be dehydrated and for removing therefrom the dehydrated material without interrupting the vacuum in said chamber.

5. A filtering or dehydrating drum made up of a central hollow pipe or shaft, a drum shell supported by said pipe or shaft and forming the inner surface of a peripheral chamber, spacing members in said chamber, an outer filtering medium and supporting means therefor forming the outer filtering layer and the outer surface of said chamber, means for securing such filtering medium at its meeting ends to the inner shell, resilient gaskets for sealing the edges of said chamber at the ends of the drum, means for clamping the edges of the filtering medium at the ends of the drum and thereby holding them in place, and means for connecting said hollow shaft to said chamber whereby a continuous suction can be applied through said pipe or shaft to said chamber.

6. A filtering or dehydrating drum comprising a central hollow shaft supporting the drum, a shell carried by said shaft, spacing elements surrounding said shell, a supporting layer for a filter medium surrounding said spacing elements, and one or more filter media carried by said support, means for clamping said filter medium or media at their meeting ends to the spacing members and to the shell, means for clamping said filter medium at the ends of the drum to hold it taut, suitable resilient packings at the ends of the drum for closing the spaces between the shell and the filter medium, and means connecting said hollow central shaft to the chamber formed between the said shell and the filter medium whereby said chamber can be subjected to a continuous suction or a vacuum.

7. A continuous-vacuum filter or dehydrator comprising a drum having a chamber provided with an outer filtering medium, means for maintaining a vacuum in said chamber, means for feeding to said drum the material to be dehydrated, and a deflector for the dehydrated material arranged and adapted to remove or deflect the pulp and leave sufficient of the pulp on the filtering layer to maintain the vacuum within said chamber.

8. A continuous-vacuum filter or dehydrator comprising a drum having a chamber provided with an outer filtering medium, means for maintaining a vacuum in said chamber, means for feeding to said drum the material to be dehydrated and a deflector for the dehydrated material made up of a plurality of diagonally arranged wires arranged to remove the dehydrated pulp from such filtering medium without interrupting the vacuum within said chamber.

9. A continuous-vacuum filter or dehydrator comprising a filter drum and a deflector for the dehydrated pulp made up of a plurality of diagonally arranged wires, said deflector being adjustable with respect to the drum and presenting a plurality of cutting elements for breaking up and removing the dehydrated material.

10. A deflector for removing or deflecting the pulp or other dehydrated material from the filtering surface of a revolving filter or dehydrator, comprising a suitable framework and a plurality of wires spaced apart and supported by said frame work and adapted to present a large number of deflecting elements arranged to be effective at varying radial distances from the filtering surface for the removal of pulp or other dehydrated material from such filter.

11. A deflector for removing or deflecting the pulp or other dehydrated material from the filtering surface of a revolving filter or dehydrator, comprising a frame, and a plurality of spaced-apart wires supported by said frame in a plane substantially tangential to the filtering surface of said filter and so arranged that each wire is inclined at an angle to both a plane perpendicular to the axis of said filter and to a plane through the axis of said filter and radial with respect thereto.

12. A deflector for removing or deflecting the pulp or other dehydrated material from the filtering surface of a revolving filter or dehydrator, comprising a substantially rectangular framework, and a plurality of wires spaced apart and diagonally arranged with respect to said frame work and supported thereby for effecting the removal or deflecting of the pulp or other dehydrated material from such filter.

13. A deflector for removing or deflecting the pulp or other dehydrated material from the filtering surface of a revolving filter or dehydrator, comprising a base, a substantially rectangular frame work supported in an inclined position on said base, means for adjusting the inclination of said frame work with respect to said base, and a plurality of spaced-apart wires secured to said frame work and arranged in substantially the same plane and adapted to present a large number of deflecting elements for the removal of pulp or other dehydrated material from the revolving filtering surface of said filter.

14. A deflector for removing or deflecting the pulp or other dehydrated material from the filtering surface of a revolving filter or dehydrator, comprising a suitable frame work and a plurality of spaced-apart wires supported by said frame work and arranged to present in every plane perpendicular to the axis of said filter a large number of independent deflecting elements each of which is progressively nearer the filtering surface than the next adjacent deflecting element for effecting the removal of dehydrated material from the filtering surface of such filter.

15. A deflector for removing or deflecting the pulp or other dehydrated material from the filtering surface of a revolving filter or dehydrator, comprising a frame, and a plurality of wires supported in substantially same plane by said frame and arranged so that any plane through the axis of the filter and radial with respect thereto intercepts a plurality of different wires at points substantially the same distance from the filtering surface.

In testimony whereof I affix my signature.

CHARLES BIESEL.